US010109872B2

(12) United States Patent
Furusawa et al.

(10) Patent No.: US 10,109,872 B2
(45) Date of Patent: Oct. 23, 2018

(54) FUEL CELL SYSTEM ACTIVATION METHOD AND FUEL CELL SYSTEM

(71) Applicant: HONDA MOTOR CO., LTD., Tokyo (JP)

(72) Inventors: Koichiro Furusawa, Wako (JP); Nobutaka Nakajima, Wako (JP); Kaoru Yamazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 512 days.

(21) Appl. No.: 14/010,759

(22) Filed: Aug. 27, 2013

(65) Prior Publication Data

US 2014/0065502 A1   Mar. 6, 2014

(30) Foreign Application Priority Data

Aug. 28, 2012   (JP) ................................. 2012-187746

(51) Int. Cl.
*H01M 8/04* (2006.01)
*H01M 8/04537* (2016.01)
(Continued)

(52) U.S. Cl.
CPC ... *H01M 8/04552* (2013.01); *H01M 8/04223* (2013.01); *H01M 8/04388* (2013.01);
(Continued)

(58) Field of Classification Search
None
See application file for complete search history.

(56) References Cited

U.S. PATENT DOCUMENTS

| 6,399,231 B1* | 6/2002 | Donahue | H01M 8/04238 |
| | | | 429/431 |
| 2005/0031917 A1* | 2/2005 | Margiott | H01M 8/04201 |
| | | | 429/429 |

(Continued)

FOREIGN PATENT DOCUMENTS

DE   10 2008 005 530 A1   7/2009
DE   10 2009 050 935 A1   6/2010
(Continued)

OTHER PUBLICATIONS

EN Translation of JP2005174855A—2005.*
(Continued)

*Primary Examiner* — Patrick Ryan
*Assistant Examiner* — Jose Colucci Rios
(74) *Attorney, Agent, or Firm* — Squire Patton Boggs (US) LLP

(57) ABSTRACT

As an activation time power generation mode of a fuel cell system, a control device executes: a first step of determining whether or not hydrogen is present in an anode gas flow path; a second step of bringing a contactor to a connected state if hydrogen is detected in the first step as being present in the anode gas flow path; a third step of supplying air to a cathode through a cathode gas flow path after the second step has been executed; and a fourth step of, if a voltage of the fuel cell stack detected by a voltage detection device reaches a predetermined voltage, connecting an electrical load to the fuel cell stack, and performing electric power generation of the fuel cell stack while maintaining the voltage at or below the predetermined voltage.

10 Claims, 5 Drawing Sheets

(51) Int. Cl.
*H01M 8/04223* (2016.01)
*H01M 8/0438* (2016.01)
*H01M 8/04746* (2016.01)

(52) U.S. Cl.
CPC ... *H01M 8/04559* (2013.01); *H01M 8/04753* (2013.01); *H01M 2250/20* (2013.01); *Y02E 60/50* (2013.01); *Y02T 90/32* (2013.01)

(56) References Cited

U.S. PATENT DOCUMENTS

| | | | |
|---|---|---|---|
| 2005/0129990 A1* | 6/2005 | Ozeki | H01M 8/04231 429/423 |
| 2007/0099040 A1* | 5/2007 | Morita et al. | 429/22 |
| 2007/0207356 A1* | 9/2007 | Miyata et al. | 429/26 |
| 2009/0081491 A1* | 3/2009 | Arthur | H01M 8/04223 429/429 |
| 2009/0263683 A1* | 10/2009 | Baumann et al. | 429/17 |
| 2010/0112382 A1* | 5/2010 | Hochgraf et al. | 429/13 |
| 2011/0086282 A1* | 4/2011 | Lerner et al. | 429/429 |
| 2011/0086283 A1* | 4/2011 | Lerner | H01M 8/04223 429/429 |
| 2011/0177414 A1* | 7/2011 | Umeda et al. | 429/432 |
| 2011/0217608 A1* | 9/2011 | Matsumoto | H01M 8/04619 429/428 |

FOREIGN PATENT DOCUMENTS

| | | |
|---|---|---|
| JP | 2005174855 A * | 6/2005 |
| JP | 2005-235546 A | 9/2005 |
| JP | 2007-179831 A | 7/2007 |
| JP | 4137796 B2 | 8/2008 |
| JP | 2008-293824 A | 12/2008 |
| JP | 4357836 B2 | 11/2009 |
| JP | 2009-301751 A | 12/2009 |
| JP | 2011-108503 A | 6/2011 |
| WO | 2011/148426 A1 | 12/2011 |

OTHER PUBLICATIONS

EN Translation of JP2007179831A—2007.*
German Search Report application No. 10 2013 216 844.6 dated Jan. 27, 2014.
German Office Action application No. 10 2013 216 844.6 dated Jan. 27, 2014.
Japanese Office Action, Notice of Reasons for Rejection application No. 2012-187746 dated Feb. 18, 2014.
Office Action dated Apr. 26, 2016, issued in corresponding JP Application No. 2015-144176 (with English translation).

* cited by examiner

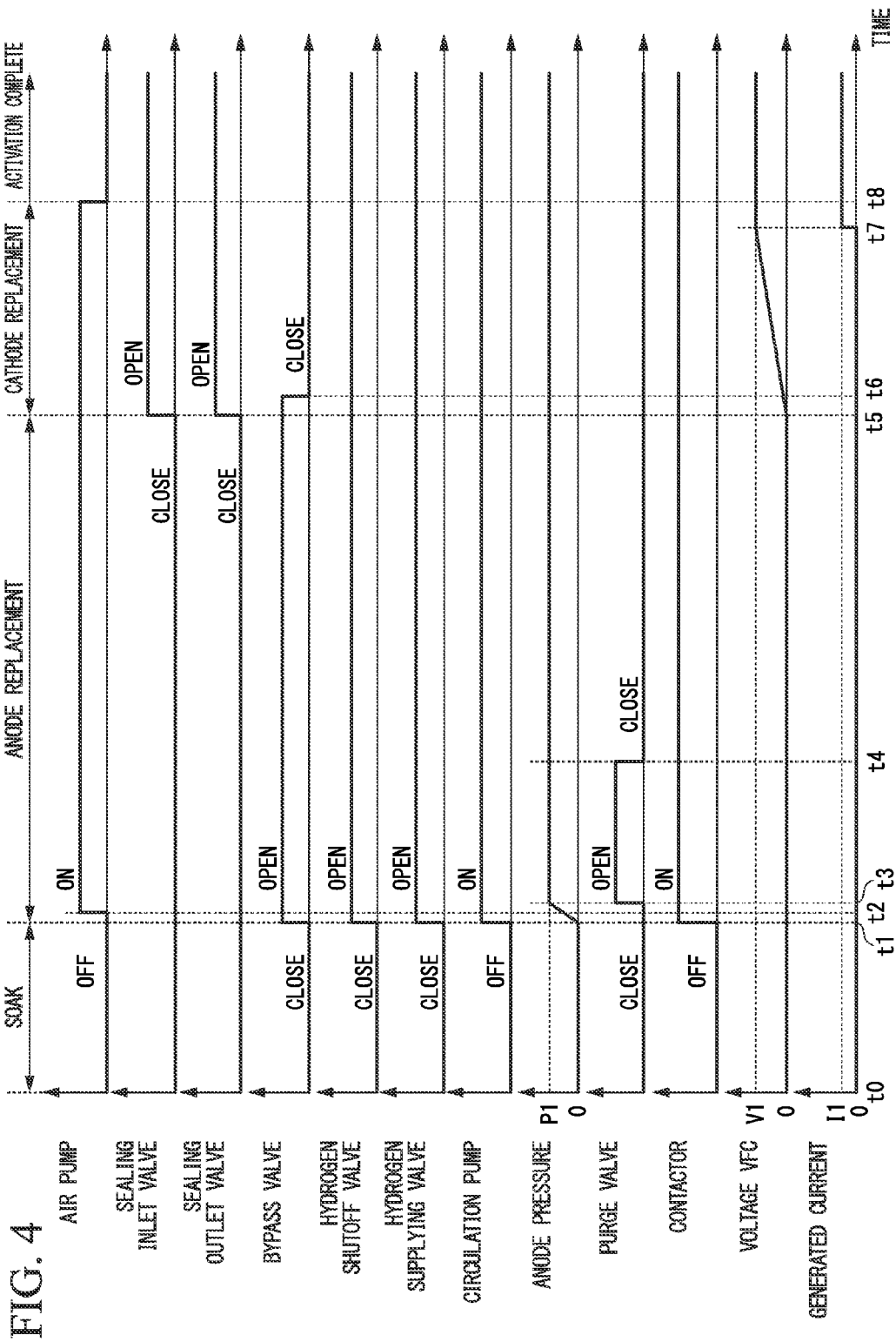

FUEL CELL SYSTEM ACTIVATION METHOD AND FUEL CELL SYSTEM

CROSS-REFERENCE TO RELATED APPLICATION

Priority is claimed on Japanese Patent Application No. 2012-187746, filed Aug. 28, 2012, the contents of which are incorporated herein by reference.

BACKGROUND

Technical Field

The present invention relates to a fuel cell system activation method and a fuel cell system.

Background Art

Heretofore, there has been known a starting method in which at the time of activating a fuel cell stack, air is not supplied to a cathode when supplying hydrogen continuously to an anode to replace (purge) air that is present at the anode with hydrogen, and after completion of the activation accompanied by this replacement (purge), air supply to the cathode is started while an electrical load is connected to the fuel cell stack, to thereby generate electric power (for example, refer to Japanese Patent No. 4357836).

Moreover, heretofore, there has been known a method for starting a fuel cell system from a state where an anode and a cathode of a fuel cell stack are charged with air (for example, refer to Japanese Patent No. 4137796).

In this starting method, when activating the fuel cell system, first, while adjusting the supply flow rate of hydrogen so that no flammable ratio of hydrogen and oxygen will be contained within the recirculation flow path of the anode, hydrogen is supplied to the anode, to thereby form a state where hydrogen and air are mixed. Then, water is produced by a catalytic reaction between hydrogen and oxygen at the anode until oxygen is no longer present within the recirculation flow path of the anode. Next, supplying of hydrogen and air to the anode and the cathode is started at normal flow rates, and an electrical load is connected to the fuel cell stack, to thereby generate electric power. In this starting method, prior to the start of supplying hydrogen to the anode, an auxiliary load resistor is connected to the fuel cell stack without supplying air to the cathode, to generate electric power, and the cell voltage is maintained at or below a predetermined voltage until oxygen is no longer present within the recirculation flow path of the anode.

SUMMARY

According to the starting method of the conventional technique above, an electrical load is connected after activation of the fuel cell stack is completed, to generate electric power. As a result, there is a possibility that it may become impossible to avoid the cathode from being at a high potential (for example, the cathode potential being 0.9V or higher), and consequently the fuel cell stack may become deteriorated.

Furthermore, according to the method for starting a fuel cell system of the conventional technique above, there is a possibility that the fuel cell stack may become deteriorated if electric power generation is performed in a state where the hydrogen concentration is lower than a desired concentration, that is, for example, where the anode and cathode of the fuel cell stack are charged with air.

An aspect of the present invention takes into consideration the above circumstances, with an object of providing a fuel cell system activation method and a fuel cell system capable of preventing deterioration in a fuel cell at the time of activation.

The aspect of the present invention employs the following measures in order to solve the above problems and achieve the object.

(1) A fuel cell system activation method of an aspect according to the present invention is a method for activating a fuel cell system comprising: a fuel cell that generates electric power with an anode gas supplied to an anode and a cathode gas supplied to a cathode; an anode gas flow path connected to the anode; an anode gas supplying device that supplies the anode gas to the anode gas flow path; a cathode gas flow path connected to the cathode; a cathode gas supplying device that supplies the cathode gas to the cathode gas flow path; a voltage detection device that detects a voltage of the fuel cell; a contactor that is capable of switching between a connected state and a cutoff state of the fuel cell and an electrical load; and a control device that controls the anode gas supplying device and the cathode gas supplying device. As an activation time power generation mode of the fuel cell, there are included: a first step of determining whether or not the anode gas is present in the anode gas flow path; a second step of bringing the contactor to a connected state if the anode gas is detected in the first step as being present in the anode gas flow path; a third step of supplying the cathode gas to the cathode through the cathode gas flow path after the second step has been executed; and a fourth step of, after execution of the third step, if a voltage of the fuel cell detected by the voltage detection device reaches a predetermined voltage, connecting the electrical load to the fuel cell, and performing electric power generation of the fuel cell while maintaining the voltage at or below the predetermined voltage.

(2) In the aspect of (1) above: the fuel cell system may be mounted on a vehicle, and may be further provided with an activation input device that instructs an activation of the vehicle; and, in a case where an activation of the vehicle is instructed by the activation input device, the second step may bring the contactor into a connected state if at least any one of a left-stopped time of the fuel cell, a voltage of the fuel cell, a pressure of the anode, and an oxygen concentration of the anode or the cathode is in a predetermined state.

(3) In the aspect of either one of (1) and (2) above: the fuel cell system may be further provided with a cathode discharge flow path that is connected to a discharge side of the cathode of the fuel cell, and a bypass flow path and a bypass valve through which the cathode gas can bypass the cathode of the fuel cell and be supplied to the cathode gas discharge flow path; and the third step may be executed while opening the bypass valve.

(4) In the aspect of (3) above: the fuel cell system may be further provided with a sealing valve that seals the cathode of the fuel cell, and it may include a step of closing the sealing valve before executing the activation time power generation mode; and the third step may be executed such that the bypass valve is closed after opening the bypass valve, and the sealing valve is opened.

(5) In the aspect of any one of (1) through (4) above, the fourth step may be executed such that the voltage of the fuel cell detected by the voltage detection device is at a voltage within a predetermined range.

(6) In the aspect of any one of (1) through (5), in a case where a predetermined length of time has elapsed from the start of execution of the activation time power generation mode, the power generation mode may shift from execution of the activation time power generation to execution of a normal power generation mode.

(7) A fuel cell system activation method of an aspect of the present invention is a method for activating a fuel cell system comprising: a fuel cell that generates electric power with an anode gas supplied to an anode and a cathode gas supplied to a cathode; an anode gas flow path connected to the anode; an anode gas supplying device that supplies the anode gas to the anode gas flow path; a cathode gas flow path that is connected to the cathode; a cathode gas supplying device that supplies the cathode gas to the cathode gas flow path; a voltage detection device that detects a voltage of the fuel cell; a control device that controls the anode gas supplying device and the cathode gas supplying device; a contactor that is capable of switching between a connected state and a cutoff state of the fuel cell and an electrical load; an anode gas circulation flow path and a circulation pump that are capable of circulating the anode gas to the anode; an anode gas discharge flow path that is connected to a discharge side of the anode; and a purge valve that is capable of switching between an open state and a shutoff state of the anode gas discharge flow path with respect to the outside. As an activation time power generation mode of the fuel cell, there are included: a fifth step of bringing the contactor into a connected state; a sixth step of driving the circulation pump after execution of the fifth step; a seventh step of starting supplying of the anode gas to the anode gas flow path and opening the purge valve, after execution of the sixth step; an eighth step of closing the purge valve after execution of the seventh step; a ninth step of supplying the cathode gas to the cathode through the cathode gas flow path, after execution of the eighth step; and a tenth step of, after execution of the ninth step, if a voltage of the fuel cell detected by the voltage detection device reaches a predetermined voltage, connecting the electrical load to the fuel cell, and performing electric power generation of the fuel cell while maintaining the voltage at or below the predetermined voltage.

(8) A fuel cell system of an aspect according to the present invention is a fuel cell system comprising: a fuel cell that generates electric power with an anode gas supplied to an anode and a cathode gas supplied to a cathode; an anode gas flow path connected to the anode; an anode gas supplying device that supplies the anode gas to the anode gas flow path; a cathode gas flow path connected to the cathode; a cathode gas supplying device that supplies the cathode gas to the cathode gas flow path; a voltage detection device that detects a voltage of the fuel cell; a contactor that is capable of switching between a connected state and a cutoff state of the fuel cell and an electrical load; and a control device that controls the anode gas supplying device and the cathode gas supplying device. As an activation time generation mode of the fuel cell, the control device executes: a first step of determining whether or not the anode gas is present in the anode gas flow path; a second step of bringing the contactor to a connected state if the anode gas is detected in the first step as being present in the anode gas flow path; a third step of supplying the cathode gas to the cathode through the cathode gas flow path after the second step has been executed; and a fourth step of, after execution of the third step, if a voltage of the fuel cell detected by the voltage detection device reaches a predetermined voltage, connecting an electrical load to the fuel cell, and performing electric power generation of the fuel cell while maintaining the voltage at or below the predetermined voltage.

(9) In the aspect of (8) above: the fuel cell system may be mounted on a vehicle, and may be further provided with an activation input device that instructs an activation of the vehicle; and, in the second step, in a case where an activation of the vehicle is instructed by the activation input device, the control device may bring the contactor into a connected state if at least any one of a left-stopped time of the fuel cell, a voltage of the fuel cell, a pressure of the anode, and an oxygen concentration of the anode or the cathode is in a predetermined state.

(10) In the aspect of either one of (8) and (9) above: the fuel cell system may be further provided with: a cathode discharge flow path that is connected to a discharge side of the cathode of the fuel cell; and a bypass flow path and a bypass valve through which the cathode gas can bypass the cathode of the fuel cell and be supplied to the cathode gas discharge flow path; and the control device may execute the third step while opening the bypass valve.

(11) In the aspect of (10) above: the fuel cell system may be further provided with a sealing valve that seals the cathode of the fuel cell; and the control device may execute a step of closing the sealing valve before executing the activation time power generation mode; and the control device may close the bypass valve after opening the bypass valve, and may open the sealing valve and execute the third step.

(12) In the aspect of any one of (8) through (11) above, the control device may execute the fourth step such that the voltage of the fuel cell detected by the voltage detection device is at a voltage within a predetermined range.

(13) In the aspect of any one of (8) through (12), in a case where a predetermined length of time has elapsed from the start of execution of the activation time power generation mode, the control device may switch from the activation time power generation and execute a normal power generation mode.

(14) A fuel cell system of an aspect of the present invention is a fuel cell system comprising: a fuel cell that generates electric power with an anode gas supplied to an anode and a cathode gas supplied to a cathode; an anode gas flow path connected to the anode; an anode gas supplying device that supplies the anode gas to the anode gas flow; a cathode gas flow path that is connected to the cathode; a cathode gas supplying device that supplies the cathode gas to the cathode gas flow path; a voltage detection device that detects a voltage of the fuel cell; a control device that controls the anode gas supplying device and the cathode gas supplying device; a contactor that is capable of switching between a connected state and a cutoff state of the fuel cell and an electrical load; an anode gas circulation flow path and a circulation pump that are capable of circulating the anode gas to the anode; an anode gas discharge flow path that is connected to a discharge side of the anode; and a purge valve that is capable of switching between an open state and a shutoff state of the anode gas discharge flow path with respect to the outside. As an activation time power generation mode of the fuel cell, the control device executes: a fifth step, as an activation time power generation mode of the fuel cell, of bringing the contactor into a connected state; a sixth step of driving the circulation pump after execution of the fifth step; a seventh step of starting supplying of the anode gas to the anode gas flow path and opening the purge valve, after execution of the sixth step; an eighth step of closing the purge valve after execution of the seventh step; a ninth step of supplying the cathode gas to the cathode through the cathode gas flow path, after execution of the eighth step; and a tenth step of, after execution of the ninth step, if a voltage of the fuel cell detected by the voltage detection device reaches a predetermined voltage, connecting the electrical load to the fuel cell, and performing electric power generation of the fuel cell while maintaining the voltage at or below the predetermined voltage.

According to the aspect of (1) above, by sequentially performing the first step through the third step, it is possible to prevent the cathode gas from being wastefully supplied to the cathode through the cathode gas flow path, in the state where the anode gas is not present at the anode.

Furthermore, it is possible to prevent an electrical load from being connected to the fuel cell (that is to say, it is possible to prevent the fuel cell from generating electric power) in the state where the anode gas is not present at the anode, and accordingly, it is possible to prevent deterioration in the fuel cell that is caused by insufficient anode gas at the time of electric power generation.

Moreover, by including the fourth step, it is possible to prevent an excessive increase in the electrical potential (for example, an increase in the electrical potential of the cathode) where no load is applied, and accordingly, it is possible to prevent deterioration in the fuel cell that is caused by an excessive increase in the electrical potential.

In the case of (2) above, anode gas is determined as being present in the anode gas flow path if at least any one of a left-stopped time of the fuel cell, a voltage of the fuel cell, a pressure of the anode, and an oxygen concentration of the anode or the cathode is in a predetermined state.

For example, anode gas is determined as being present at the anode and the cathode if the left-stopped time of the fuel cell is within a predetermined length of time.

Moreover, for example, anode gas is determined as being present at the anode if the voltage of the fuel cell is lower than or equal to a predetermined voltage.

Furthermore, for example, anode gas is determined as being present at the anode if the pressure of the anode is higher than or equal to a predetermined pressure, or if the variation width of the pressure of the anode is on a declining trend while the fuel cell is in the left-stopped state.

Moreover, for example, anode gas is determined as being present at the anode if the oxygen concentration of the anode or the cathode is lower than or equal to a predetermined concentration.

In the case of (3) above, if the cathode gas is supplied to the cathode through the cathode gas flow path, the anode gas present at the cathode is pushed to the cathode gas discharge flow path by the cathode gas.

In this case, by opening the bypass valve, it is possible, with the cathode gas that has flowed through the bypass flow path, to dilute the anode gas in the cathode gas discharge flow path.

Furthermore, since the cathode gas supplied to the cathode gas flow path branches and flows to the cathode and to the bypass flow path, it is possible to reduce the cathode gas to be introduced to the cathode, and prevent the concentration of the anode gas to be discharged from the cathode from becoming excessive.

In the case of (4) above, by closing the bypass valve and opening the sealing valve after opening the bypass valve to execute the third step, it is possible to have the cathode gas concentration of the cathode precisely at a desired concentration.

In the case of (5) above, by having the voltage of the fuel cell within a predetermined range with a constant voltage control for example, it is possible to easily prevent an excessive increase in the electrical potential without the need of complicated control.

In the case of (6) above, by executing the normal power generation mode after completing the fuel cell system activation, it is possible to reduce the gas supply amount and the electric current to be generated, and improve the operation efficiency of the fuel cell system.

According to the aspect of (7) above, it is possible to appropriately prevent an excessive increase in electric voltage while precisely having the anode gas concentration of the anode at a desired concentration.

According to the aspect of (8) above, by sequentially performing the first step through the third step, the control device is able to prevent the cathode gas from being wastefully supplied to the cathode through the cathode gas flow path, in the state where the anode gas is not present at the anode.

Furthermore, it is possible to prevent an electrical load from being connected to the fuel cell (that is to say, it is possible to prevent the fuel cell from generating electric power) in the state where the anode gas is not present at the anode, and accordingly, it is possible to prevent deterioration in the fuel cell that is caused by insufficient anode gas at the time of electric power generation.

Moreover, by including the fourth step, it is possible to prevent an excessive increase in the electrical potential (for example, an increase in the electrical potential of the cathode) where no load is applied, and accordingly, the control device is able to prevent deterioration in the fuel cell that is caused by an excessive increase in the electrical potential.

In the case of (9) above, the control device determines anode gas as being present in the anode gas flow path if at least any one of a left-stopped time of the fuel cell, a voltage of the fuel cell, a pressure of the anode, and an oxygen concentration of the anode or the cathode is in a predetermined state.

For example, anode gas is determined as being present at the anode and the cathode if the left-stopped time of the fuel cell is within a predetermined length of time.

Moreover, for example, anode gas is determined as being present at the anode if the voltage of the fuel cell is lower than or equal to a predetermined voltage.

Furthermore, for example, anode gas is determined as being present at the anode if the pressure of the anode is higher than or equal to a predetermined pressure, or if the variation width of the pressure of the anode is on a declining trend while the fuel cell is in the left-stopped state.

Moreover, for example, anode gas is determined as being present at the anode if the oxygen concentration of the anode or the cathode is lower than or equal to a predetermined concentration.

In the case of (10) above, if the cathode gas is supplied to the cathode through the cathode gas flow path, the anode gas present at the cathode is pushed to the cathode gas discharge flow path by the cathode gas.

In this case, by opening the bypass valve, the control device is able, with the cathode gas that has flowed through the bypass flow path, to dilute the anode gas in the cathode gas discharge flow path.

Furthermore, since the cathode gas supplied to the cathode gas flow path branches and flows to the cathode and to the bypass flow path, it is possible to reduce the cathode gas to be introduced to the cathode, and prevent the concentration of the anode gas to be discharged from the cathode from becoming excessive.

In the case of (11) above, by closing the bypass valve and opening the sealing valve after opening the bypass valve to execute the third step, the control device is able to have the cathode gas concentration of the cathode precisely at a desired concentration.

In the case of (12) above, by having the voltage of the fuel cell within a predetermined range with a constant voltage control for example, the control device is able to easily prevent an excessive increase in the electrical potential without the need of complicated control.

In the case of (13) above, by executing the normal power generation mode after completing the fuel cell system activation, the control device is able to reduce the gas supply amount and the electric current to be generated, and improve the operation efficiency of the fuel cell system.

According to the aspect of (14) above, the control device is able to appropriately prevent an excessive increase in electric voltage while precisely having the anode gas concentration of the anode at a desired concentration.

BRIEF DESCRIPTION OF THE DRAWINGS

FIG. 4 is a diagram showing the state of each system of the anode, the cathode, and a power supply at the time of activating the fuel cell system.

DESCRIPTION OF EMBODIMENTS

Hereunder, a fuel cell system and a fuel cell system activation method according to an embodiment of the present invention are described, with reference to the accompanying drawings.

A fuel cell system 10 of the present embodiment is mounted as a power supply, for example, on a vehicle 1 that is provided with a propulsion motor (M) and a power drive unit (PDU) that controls the motor (M).

The vehicle 1 is provided with a switch 2, such as an ignition switch, that outputs a signal for instructing an activation of the vehicle 1 according to an input operation or the like performed by a driver.

Figure 1:
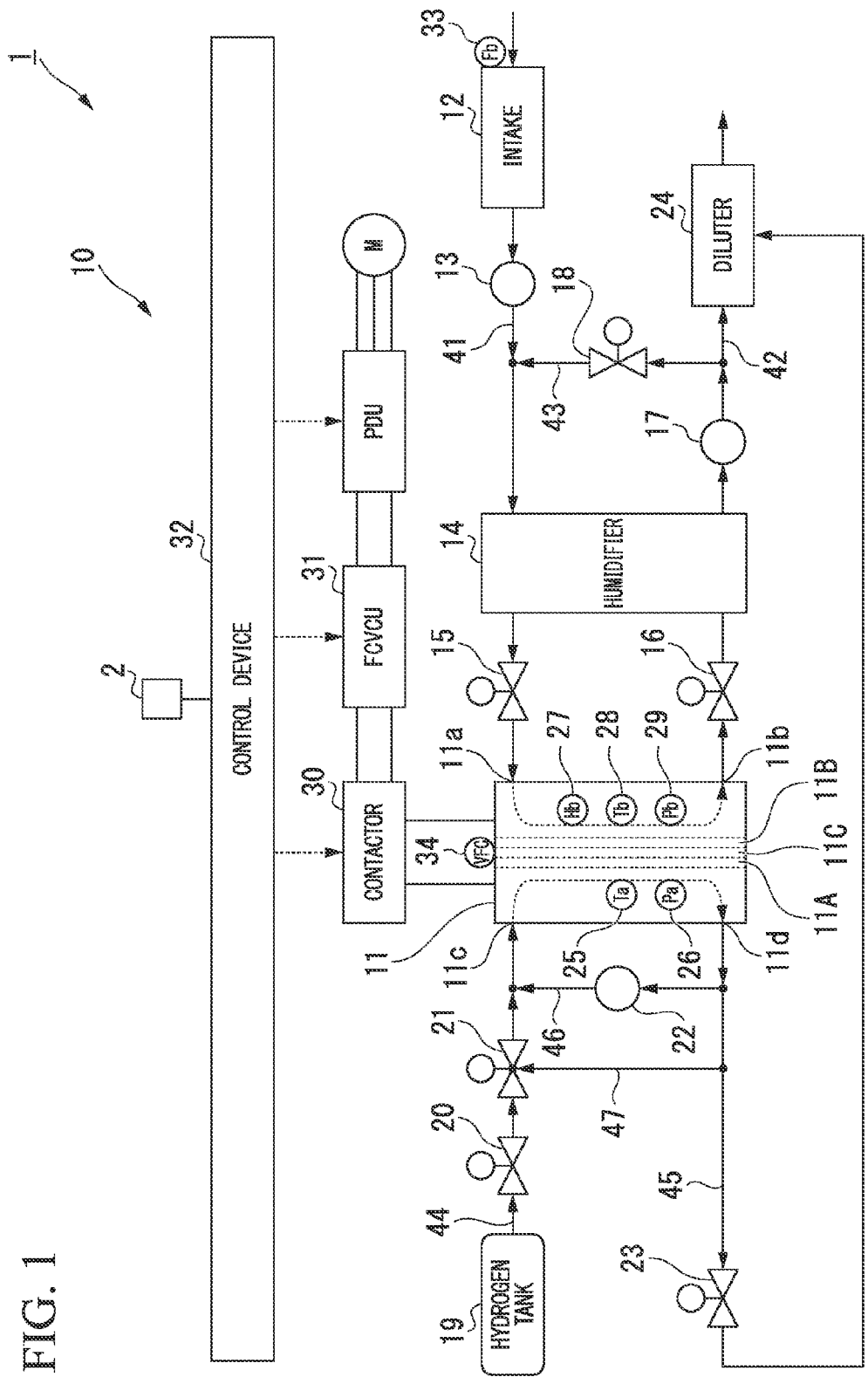
FIG. 1 is a block diagram of a fuel cell system according to an embodiment of the present invention.

For example, as shown in FIG. 1, the fuel cell system 10 comprises: a fuel cell stack 11 (fuel cell); an intake 12; an air pump 13 (cathode gas supplying device); a humidifier 14; a sealing inlet valve 15 (cathode gas supplying device, sealing valve); a sealing outlet valve 16 (cathode gas supplying device, sealing valve); a pressure control valve 17; a bypass valve 18; a hydrogen tank 19 (anode gas supplying device); a hydrogen shutoff valve 20 (anode gas supplying device); a hydrogen supplying valve 21 (anode gas supplying device); a circulation pump 22; a purge valve 23; a diluter 24; an anode temperature sensor 25 and anode pressure sensor 26; a cathode humidity sensor 27, a cathode temperature sensor 28 and cathode pressure sensor 29; a contactor 30; a voltage regulator 31; and a control device 32 (control device).

The fuel cell stack 11, for example, comprises a lamination body (not shown in the figure) with a plurality of fuel cells (not shown in the figure) laminated therein, and a pair of end plates (not shown in the figure) that sandwich this lamination body from both sides in the lamination direction thereof.

The fuel cells are provided, for example, with a membrane electrode assembly (MEA: membrane electrode assembly) (not shown in the figure), and a pair of separators (not shown in the figure) that sandwich this membrane electrode assembly from both sides thereof in the assembling direction.

The membrane electrode assembly is provided, for example, with a fuel electrode (anode) 11A composed of an anode catalyst and a gas diffusion layer, an oxygen electrode (cathode) 11B composed of a cathode catalyst and a gas diffusion layer, and a solid polymer electrolyte membrane 11C composed of a cation-exchange membrane that is sandwiched from both sides in the thickness direction by the anode and the cathode.

A fuel gas (anode gas) composed, for example, of hydrogen is supplied from the hydrogen tank 19 to the anode 11A of the fuel cell stack 11, and air, which is an oxidant gas (cathode gas) containing oxygen, for example, is supplied from the air pump 13 to the cathode 11B.

The hydrogen supplied to the anode 11A is ionized on the anode catalyst by a catalytic reaction, and the hydrogen ions move to the cathode 11B via the solid polymer electrolyte membrane 11C that is appropriately humidified. Electrons that are produced as a result of the movement of the hydrogen ions can be extracted as a direct electric current to an external circuit (not shown in the figure).

The hydrogen ions that have moved from the anode 11A onto the cathode catalyst of the cathode 11B react with oxygen supplied to the cathode and electrons on the cathode catalyst, and produce water.

To the plurality of fuel cells of the fuel cell stack 11, there may be connected a reference electrode (not shown in the figure) such as DHE (dynamic hydrogen electrode).

The reference electrode is capable of measuring the electrical potential of the anode 11A (anode electrical potential) with respect to a reference electrical potential where the hydrogen is taken as the reference electrical potential (0V) for example, and outputting a measurement result signal to the control device 32.

The reference electrode may be provided on all of the plurality of fuel cells, or it may be provided only on predetermined fuel cells among the plurality of the fuel cells.

The air pump 13 is provided, for example, with an air compressor that is driven and controlled by the control device 32, and it takes in and compresses air from the outside through the intake 12, and discharges the air that has been compressed to a cathode gas flow path 41 that is connected to the anode 11A.

For example, the intake 12 is provided with an air flow sensor 33, and the air flow sensor 33 detects a flow rate Fb of air that is taken in from the outside by the air pump 13, and outputs a signal of the detection result.

The humidifier 14 is configured by being provided with a water permeable membrane such as a hollow fiber membrane, and it uses discharged gas (cathode off-gas), such as air discharged from a cathode discharge opening 11b of the fuel cell stack 11, as humidifying gas, to humidify the air that is supplied from the air pump 13 (cathode gas).

That is to say, the humidifier 14, for example, brings the air supplied from the air pump 13 and the discharged gas in a humidified state that is discharged from the cathode discharge opening 11b of the fuel cell stack 11 into contact with each other via the water permeable membrane, to thereby add the moisture content that has penetrated through membrane pores of the water permeable membrane, among the moisture content contained in the discharged gas (water vapor in particular), to the air (cathode gas).

The sealing inlet valve 15 is provided, for example, on the cathode gas flow path 41 that connects the air pump 13 with a cathode supply opening 11a capable of supplying air to the cathode 11B of the fuel cell stack 11, and it is capable of shutting off the cathode gas flow path 41 with control of the control device 32.

The sealing outlet valve 16 is provided, for example, on the cathode gas discharge flow path 42 that connects the cathode discharge opening 11b capable of discharging air from the cathode 11B of the fuel cell stack 11, with the diluter 24, and it is capable of shutting off the cathode gas flow path 42 with control of the control device 32.

The pressure control valve 17 is, for example, provided between the humidifier 14 and the diluter 24 on the cathode gas discharge flow path 42, and it controls, with control of the control device 32, the pressure of cathode off-gas of the cathode gas discharge flow path 42.

The bypass valve 18 is, for example, provided on a bypass flow path 43 that connects between the air pump 13 and the humidifier 14 on the cathode gas flow path 41, and between the pressure control valve 17 and the diluter 24 on the cathode gas discharge flow path 42.

The bypass valve 18, for example, is capable of branching the air supplied from the air pump 13 from the cathode gas flow path 41 and supplying it into the diluter 24 through the bypass flow path 43, and it is also capable, with control of the control device 32, of shutting off the bypass flow path 43.

The hydrogen tank 19 is, for example, capable of storing compressed hydrogen and discharging the hydrogen.

A hydrogen shutoff valve 20 is, for example, provided on the anode gas flow path 44 that connects the hydrogen tank 19 with the anode supplying opening 11c capable of supplying hydrogen to the anode 11A of the fuel cell stack 11, and it is capable of shutting off the anode gas flow path 44 with control of the control device 32.

A hydrogen supplying valve 21 is, for example, provided between the hydrogen shutoff valve 20 and the anode supplying opening 11c on the anode gas flow path 44, and it supplies hydrogen with a pressure according to the control of the control device 32 or the pressure of the air discharged from the air pump 13, from the hydrogen tank 19 to the anode gas flow path 44. Thereby, the inter-electrode differential pressure between the anode 11A and the cathode 11B of the fuel cell stack 11 is maintained at a predetermined pressure.

The hydrogen supplying valve 21 is, for example, provided with an ejector (not shown in the figure) that is connected to a branched flow path 47 branching from the anode gas discharge flow path 45.

The ejector, for example, when the circulation pump 22 has not been operated, mixes at least some of the hydrogen that has flowed through the anode 11A of the fuel cell stack 11 and discharged from the anode discharge opening 11d and that has not undergone a reaction, with the hydrogen that has been supplied from the hydrogen shutoff valve 20 to the anode gas flow path 44, and supplies it to the anode 11A of the fuel cell stack 11 again.

The circulation pump 22 is, for example, provided on a circulation flow path 46 (anode gas circulation flow path) that connects between the hydrogen supplying valve 21 and the anode supplying opening 11c on the anode gas flow path 44, with the anode gas discharge flow path 45 connecting the diluter 24 with the anode discharge opening 11d capable of discharging hydrogen from the anode 11A of the fuel cell stack 11.

The circulation pump 22 mixes at least some of the hydrogen that has flowed through the anode 11A of the fuel cell stack 11 and discharged from the anode discharge opening 11d and that has not undergone a reaction, with the hydrogen that has been supplied from the hydrogen supplying valve 21 to the anode gas flow path 44, and supplies it to the anode 11A of the fuel cell stack 11 again.

The purge valve 23 is, for example, provided between the anode discharge opening 11d and the diluter 24 on the anode gas discharge flow path 45, and it is capable, with control of the control device 32, of shutting off the anode gas discharge flow path 45 while being capable, with control of the control device 32, of supplying discharged gas such as hydrogen that has been discharged from the anode discharge opening 11d and that has not undergone a reaction, to the diluter 24.

The diluter 24, for example, dilutes the hydrogen concentration of the discharged gas supplied from the purge valve 23, with air supplied from the pressure control valve 17, and discharges the discharged gas, in which the hydrogen concentration has been reduced to or below a predetermined concentration after dilution, to the outside (for example, to the atmosphere).

The anode temperature sensor 25 and the anode pressure sensor 26, for example, detect a temperature Ta and a pressure Pa of hydrogen serving as the anode gas to be supplied to the anode 11A of the fuel cell stack 11, and output detection result signals.

The cathode humidity sensor 27, the cathode temperature sensor 28, and the cathode pressure sensor 29, for example, detect a humidity Hb, a temperature Tb, and a pressure Pb of the air serving as the cathode gas to be supplied to the cathode 11B of the fuel cell stack 11, and output detection result signals.

The contactor 30, for example, is connected to a positive electrode and a negative electrode of the fuel cell stack 11, and it is capable, with control of the control device 32, of switching between a connected state and a cutoff state of the fuel cell stack 11 and an electrical load (such as power unit (PDU), motor (M), and so forth).

For example, between the fuel cell stack 11 and the contactor 30, there is provided a voltage sensor 34 (voltage detection device) that detects a voltage VFC between the positive electrode and the negative electrode of the fuel cell stack 11 (that is, the total voltage being the sum of voltages of the plurality of fuel cells), and the voltage sensor 34 outputs a signal of the detection result.

The voltage regulator (FCVCU) 31, for example, is arranged between the positive and negative electrodes of the fuel cell stack 11 via the contactor 30, and the electrical load, and it is capable, with control of the control device 32, of regulating the voltage and the current output from the fuel cell stack 11.

The control device 32, for example, after a signal that instructs activation of the vehicle 1 has been output from the switch 2, controls operations of the fuel cell system 10 based on the detection result signals output from the respective sensors 25 through 29, 33, and 34.

In addition to the electric devices such as the propulsion motor (M) and the power drive unit (PDU) mounted on the vehicle 1, to which electric power is supplied from the fuel cell stack 11, the fuel cell system 10 may also be provided, for example, with an electrical load that is capable, with control of the control device 32, of switching between a connected state and a cutoff state with respect to the fuel cell stack 11, and that is capable of changing load current (for example, a discharge resistor or an electronic load).

In this case, the control device 32 is able to perform electrical discharge to the electrical load as an electrical discharge performed when the fuel cell stack 11 generates electric power.

The control device 32, for example, as an activation time power generation mode of the fuel cell system 10, executes a first step, a second step, a third step, and a fourth step sequentially.

The control device 32, for example, in the first step, determines whether or not hydrogen is present on the anode gas flow path 44.

The control device 32, for example, in the second step, brings the contactor 30 to the connected state if hydrogen is determined in the first step as being present on the anode gas flow path 44.

The control device 32, for example, in the third step, supplies air to the cathode 11B via the cathode gas flow path 41.

The control device 32, for example, in the fourth step, if the voltage VFC detected by the voltage sensor 34 reaches a predetermined voltage, connects the electrical load to the fuel cell stack 11, and performs electric power generation of the fuel cell stack 11 (that is, discharge to the electrical load) while maintaining the output voltage VFC at or below the predetermined voltage.

The control device 32, for example, in the second step, in a case where an activation of the vehicle 1 is instructed by the switch 2, brings the contactor 30 to the connected state if at least any one of the left-stopped time (soak time) of the fuel cell system 10, the voltage VFC of the fuel cell stack 11, the pressure Pa of the anode 11A, and the oxygen concentration of the anode 11A or the cathode 11B is in a predetermined state.

For example, if the left-stopped time (soak time) of the fuel cell system 10 is within the predetermined length of time, the control device 32 determines hydrogen as being present at the anode 11A and the cathode 11B.

Furthermore, for example, if the voltage VFC of the fuel cell stack 11 is lower than or equal to the predetermined voltage, the control device 32 determines hydrogen as being present at the anode 11A. On the other hand, if the voltage VFC of the fuel cell stack 11 is higher than the predetermined voltage, it is determined that there is a possibility of the voltage VFC increasing due to the hydrogen being supplied to the anode 11A, as a result of oxygen being present at the cathode 11B.

Moreover, for example, if the pressure Pa of the anode 11A is at or above the predetermined pressure, or if the variation width of the pressure Pa of the anode 11A is on a declining trend while the fuel cell system 10 is in the left-stopped state, the control device 32 determines hydrogen as being present at the anode 11A.

Furthermore, for example, if the oxygen concentration of the anode 11A or the cathode 11B is lower than or equal to the predetermined concentration, the control device 32 determines hydrogen as being present at the anode 11A.

Figure 2A:
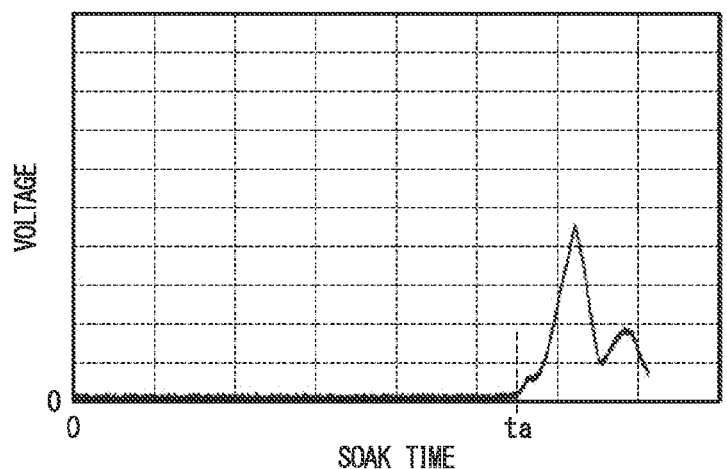
FIG. 2A is a graph showing an example of the relationship between the voltage of a fuel cell stack and the soak time where the fuel cell system is in a left-stopped state.
Figure 2B:
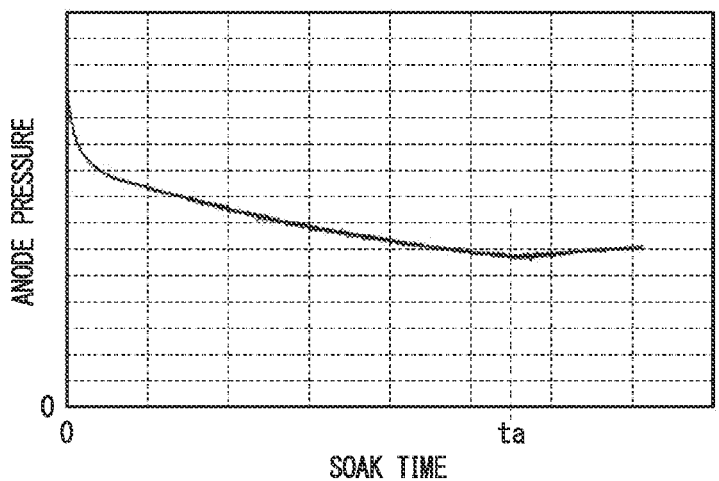
FIG. 2B is a graph showing an example of the relationship between the anode pressure of the fuel cell stack and the soak time where the fuel cell system is in a left-stopped state.
Figure 2C:
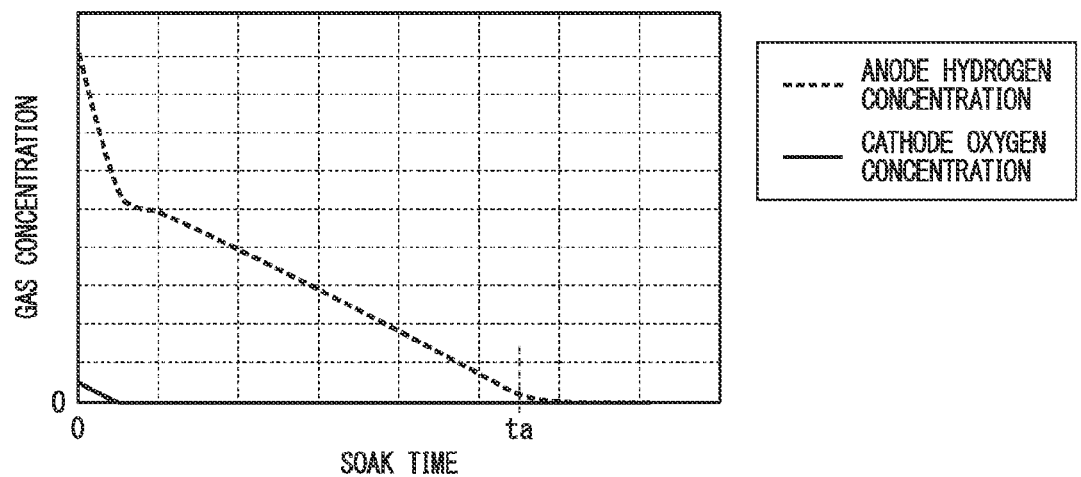
FIG. 2C is a graph showing an example of the relationship between the gas concentration of an anode and a cathode of the fuel cell stack and the soak time where the fuel cell system is in a left-stopped state.

For example, as shown in FIG. 2A to FIG. 2C, when the sealing inlet valve 15 and the sealing outlet valve 16 are shut off and the fuel cell system 10 is brought into the left-stopped state after the predetermined stop time power generation is executed at the time of the previous stop time of the fuel cell system 10 and the oxygen concentration of the cathode 11B is reduced, the oxygen concentration of the cathode 11B becomes substantially zero.

In contrast, as a result of hydrogen consumption associated with the hydrogen flowing out from the anode 11A and the air flowing to the anode 11A, the hydrogen concentration and the pressure of the anode 11A change with a declining trend.

If the hydrogen concentration of the anode 11A decreases to or below the predetermined concentration due to the increase in the soak time as observed at time to for example, the voltage VFC of the fuel cell stack 11 increases from zero due to the air flowing from the anode 11A remaining. As a result, the pressure of the anode 11A changes with an increasing trend.

Therefore, in the case where the voltage VFC of the fuel cell stack 11 is lower than or equal to the predetermined voltage, and in the case where the variation width of the pressure Pa of the anode 11A has a declining trend, hydrogen is determined as being present at the anode 11A.

The control device 32, for example, executes the third step while opening the bypass valve 18.

The control device 32, for example, after opening the bypass valve 18, closes the bypass valve 18, opens the sealing inlet valve 15 and the sealing outlet valve 16, and executes the third step.

The control device 32, for example with constant voltage control or the like, executes the fourth step so that the voltage VFC of the fuel cell stack 11 detected by the voltage sensor 34 becomes the voltage within the predetermined range.

The control device 32, for example, switches from the activation time power generation mode and executes the normal power generation mode when a predetermined length of time has elapsed from the beginning of the execution of the activation time power generation mode.

The normal power generation mode is an operation mode that includes the idle operation state of the fuel cell system 10, and it is an operation mode in a state where the air stoichiometry (that is, the ratio of the supply amount with respect to the theoretical cathode gas consumption amount required to output generated electric current at a desired level) is even lower and the generated electric current is even lower, compared to the case of the activation time power generation mode.

Moreover, the control device 32, for example, as the activation time power generation mode of the fuel cell system 10, executes a fifth step, a sixth step, a seventh step, an eighth step, a ninth step, and a tenth step sequentially.

The control device 32, for example in the fifth step, switches the contactor 30 from the open state to the connected state.

The control device 32, for example in the sixth step, drives the circulation pump 22.

The control device 32, for example in the seventh step, starts supplying of hydrogen to the anode gas flow path 44 and opens the purge valve 23.

The control device 32, for example in the eighth step, closes the purge valve 23 after a predetermined purging has been performed.

The control device 32, for example in the ninth step, supplies air to the cathode 11B via the cathode gas flow path 41.

The control device 32, for example in the tenth step, if the voltage VFC detected by the voltage sensor 34 reaches a predetermined voltage, connects the electrical load to the fuel cell stack 11, and performs electric power generation of the fuel cell stack 11 (that is, discharge to the electrical load) while maintaining the output voltage VFC at or below the predetermined voltage.

The fuel cell system 10 according to the present embodiment is provided with the above configuration. Next, there are described operations of this fuel cell system 10, in particular, control operations performed by the control device 32 at the time of activation of the fuel cell system 10 after the signal of instructing the activation of the vehicle 1 has been output from the switch 2 (that is, a method for activating the fuel cell system 10).

Figure 3:
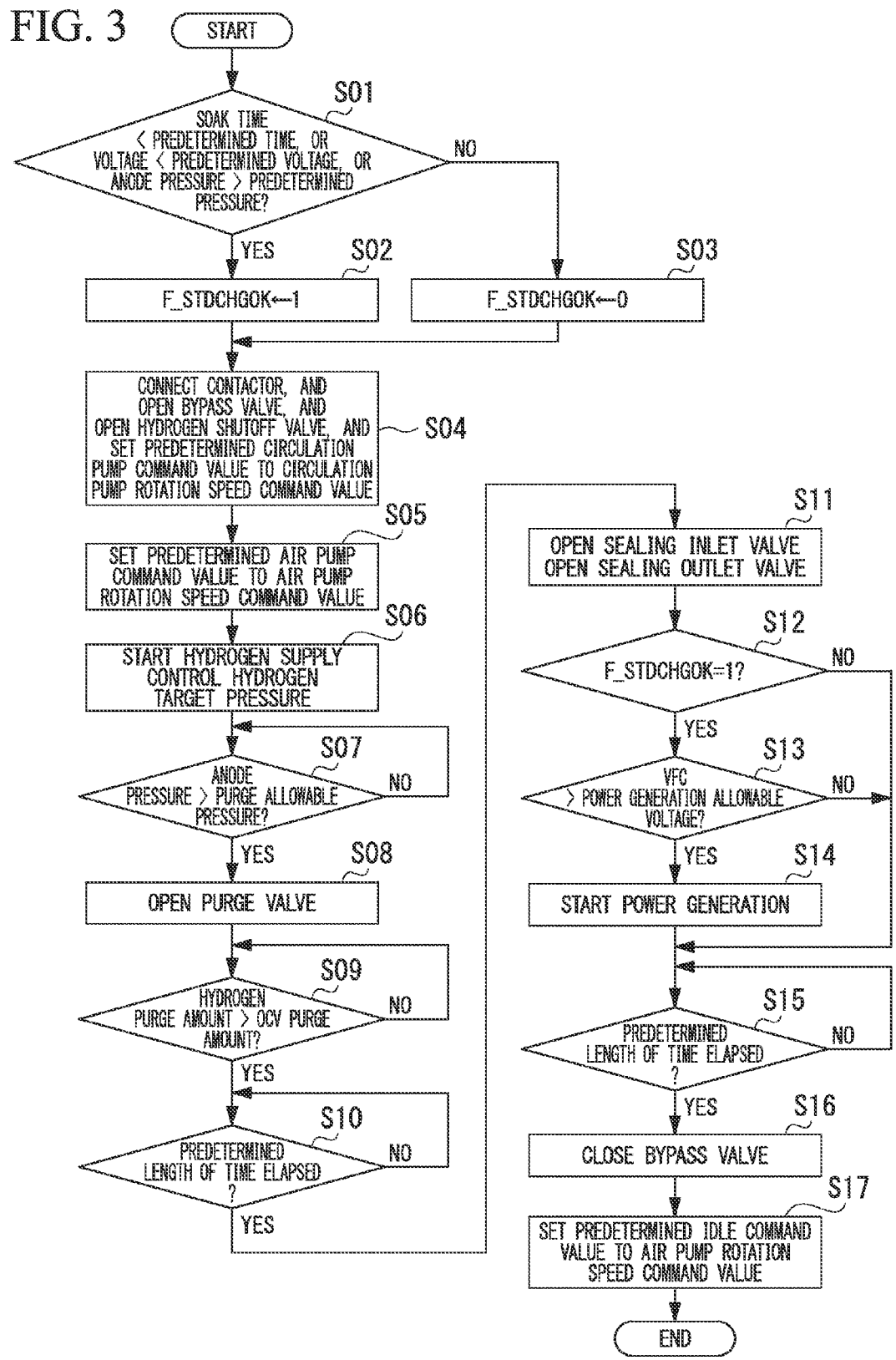
FIG. 3 is a flow chart showing an operation of the fuel cell system, in particular, a control operation performed by a control device at the time of activating the fuel cell system (that is, a fuel cell system activation method).

First, for example in step S01 shown in FIG. 3, it is determined; whether or not the left-stopped time (soak time) of the fuel cell system 10 when the sealing inlet valve 15 and the sealing outlet valve 16 are in the shutoff state is within the predetermined length of time, whether or not the voltage VFC of the fuel cell stack 11 is lower than or equal to the predetermined voltage, or whether or not the pressure Pa of the anode 11A (such as the pressure of the hydrogen on the inlet side of the anode 11A) is higher than or equal to the predetermined pressure.

If the result of at least any one of these determinations is "YES", hydrogen is determined as being present at the anode 11A, and the process proceeds to step S02. In step S02, "1" that indicates power generation of the fuel cell stack 11 (that is, discharge to the electrical load) is set to the flag value of an activation time discharge execution flag F_STDCHGOK.

On the other hand, if the results of all of these determinations are "NO", hydrogen is determined as not being present at the anode 11A, and the process proceeds to step S03. In step S03, "0" that indicates inhibition of power generation of the fuel cell stack 11 (that is, discharge to the electrical load) is set to the flag value of the activation time discharge execution flag F_STDCHGOK.

Next, in step S04, the contactor 30 is switched from the open state to the connected state. Then, the bypass valve 18, the hydrogen shutoff valve 20, and the hydrogen supplying valve 21 are opened.

The circulation pump 22 is then driven, and as a command value with respect to the rotation speed of the circulation pump 22, there is set a predetermined activation time command value (predetermined circulation pump command value).

Next, in step S05, the air pump 13 is driven, and as a command value with respect to the rotation speed of the air pump 13, for example, there is set a predetermined activation time command value that corresponds to a predetermined dilution air amount of the air to be supplied to the diluter 24 (predetermined air pump command value).

Next, in step S06, supplying of hydrogen to the anode gas flow path 44 is started, and the pressure Pa of the anode 11A (such as the pressure of hydrogen on the inlet side of the anode 11A) is controlled so that it becomes the predetermined target pressure.

Next, in step S07, it is determined whether or not the pressure Pa of the anode 11A (such as the pressure of hydrogen on the inlet side of the anode 11A) is higher than a predetermined purge allowable pressure.

If the result of this determination is "NO", the determination processing of step S07 is repeated.

On the other hand, if the result of this determination is "YES", the process proceeds to step S08.

In step S08, the purge valve 23 is opened.

Then in step S09, it is determined whether or not the hydrogen purge amount (that is, the hydrogen discharge amount from the purge valve 23) is greater than a predetermined OCV purge amount.

If the result of this determination is "NO", the determination processing of step S07 is repeated.

On the other hand, if the result of this determination is "YES", the purge valve 23 is closed and the process proceeds to step S10.

Next, in step S10, it is determined whether or not a predetermined length of time has elapsed since the purge valve 23 has been closed.

If the result of this determination is "NO", the determination processing of step S10 is repeated.

On the other hand, if the result of this determination is "YES", the process proceeds to step S11.

Next, in step S11, the sealing inlet valve 15 and the sealing outlet valve 16 in the shutoff state are switched to the open state.

Next, in step S12, it is determined whether or not the flag value of the activation time discharge execution flag F_STDCHGOK is "1".

If the result of this determination is "NO", the process proceeds to step S15 described later.

On the other hand, if the result of this determination is "YES", the process proceeds to step S13.

Next, in step S13, it is determined whether or not the voltage VFC of the fuel cell stack 11 is higher than a predetermined power generation allowable voltage.

If the result of this determination is "NO", the process proceeds to step S15 described later.

On the other hand, if the result of this determination is "YES", the process proceeds to step S14.

In step S14, electric power generation of the fuel cell stack 11 (that is, discharge to the electrical load) is started.

Next, in step S15, it is determined whether or not a predetermined length of time has elapsed since the sealing inlet valve 15 and the sealing outlet valve 16 that had been in the shutoff state, were switched to the open state.

If the result of this determination is "NO", the determination processing of step S15 is repeated.

On the other hand, if the result of this determination is "YES", the process proceeds to step S16.

In step S16, the bypass valve 18 is closed.

Next, in step S17, as a command value with respect to the rotation speed of the air pump 13, for example, there is set a predetermined activation time command value that corresponds to a predetermined normal operation time air amount discharged to the cathode gas flow path 41 when the air pump 13 is in the idle operation state (for example, a predetermined idle command value or the like), and the process proceeds to the end state.

As observed in a period from time t0 to time t1 shown in FIG. 4 for example, if the fuel cell system 10 is in the left-stopped (soak) state when the vehicle 1 is in the stop state, the sealing inlet valve 15, the sealing outlet valve 16, the bypass valve 18, the hydrogen shutoff valve 20, the hydrogen supplying valve 21, and the purge valve 23 are in the shutoff (CLOSED) state. Furthermore, the air pump 13 and the circulation pump 22 are in the stop (OFF) state, the contactor 30 is in the open (OFF) state, and the pressure of the anode 11A and the voltage VFC and the generated current of the fuel cell stack 11 are all zero.

For example, at time t1 where the signal that instructs activation of the vehicle 1 is output from the switch 2, replacement at the anode 11A by hydrogen (so-called OCV purge) is started when no load is applied where the fuel cell stack 11 is cutoff from the electrical load (that is, in the non-power generation state).

In this anode replacement, the bypass valve 18, the hydrogen shutoff valve 20, and the hydrogen supplying valve 21 are switched from the shutoff state to the open (OPEN) state. The contactor 30 is switched from the open state to the connected (ON) state. Then, the circulation pump 22 begins to drive.

Furthermore, the air pump 13 begins to drive at time t2 where a predetermined length of time has elapsed from time t1, that is, the connected (ON) timing of the contactor 30.

As a result, for example, hydrogen is added to the anode 11A where hydrogen has been determined as being present, according to the soak time, and the anode pressure Pa gradually increases from zero at time t1 and thereafter.

For example, if the pressure Pa of the anode 11A reaches a predetermined purge allowable pressure P1 at time t3, the purge valve 23 is switched from the shutoff state to the open state.

Then, for example, at time t4 where the hydrogen purge amount (that is, the hydrogen discharge amount from the purge valve 23) becomes greater than the predetermined OCV purge amount, the purge valve 23 is switched from the open state to the shutoff state.

For example, at time t5 where a predetermined length of time has elapsed since the purge valve 23 was brought to the shutoff state, the sealing inlet valve 15 and the sealing outlet valve 16 are switched from the shutoff state to the open state. As a result, the anode replacement is completed, and replacement of cathode 11B with air is started. With this start of the cathode replacement, air is supplied to the cathode 11B, and the voltage VFC of the fuel cell stack 11 gradually increases from zero at time t5 and thereafter.

With the anode replacement being completed and the cathode replacement being executed after the predetermined length of time has been elapsed since the purge valve 23 was brought to the shutoff state, the hydrogen discharged from the purge valve 23 by the anode replacement is diluted with air, so that the concentration of hydrogen discharged from the purge valve 23 by the cathode replacement will not exceed a predetermined specified value.

For example, at time t6 where an appropriate length of time has elapsed, the bypass valve 18 is closed.

Moreover, for example, at time t7 where the voltage VFC of the fuel cell stack 11 reaches a predetermined power generation allowable voltage V1, power generation of the fuel cell stack 11 (that is, discharge to the electrical load) is started with constant voltage control, and the generated current of the fuel cell stack 11 changes from zero to a predetermined current I1.

For example, at time t8 where a predetermined length of time has elapsed since the sealing inlet valve 15 and the sealing outlet valve 16 in the shutoff state were switched to the open state, the air pump 13 is stopped, the cathode replacement is ended, and the activation of the fuel cell system 10 is completed.

Figure 5A:
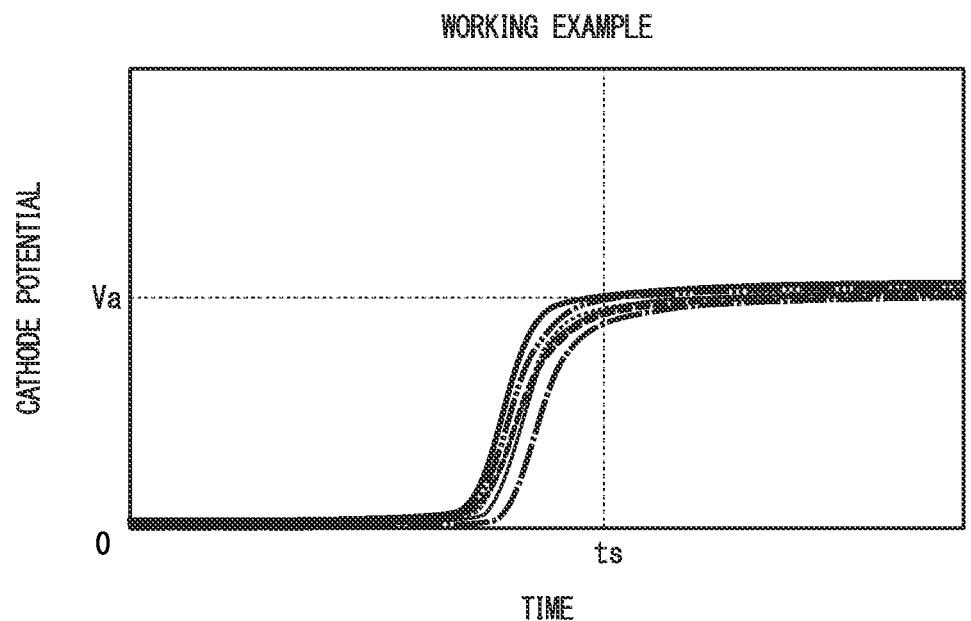
FIG. 5A is a graph showing an example of changes in the electrical potential of the cathode of a working example at the time of activating the fuel cell system.

As shown in FIG. 4 described above, in the case where the fuel cell system 10 is activated by executing the anode replacement and the cathode replacement, for example, as with a working example shown in FIG. 5A, it is possible to suppress the electrical potential of the cathode 11B of the plurality of fuel cells of the fuel cell stack 11 approximately at a predetermined potential Va, by executing power generation of the fuel cell stack 11 (that is discharge to the electrical load) at time ts.

Figure 5B:
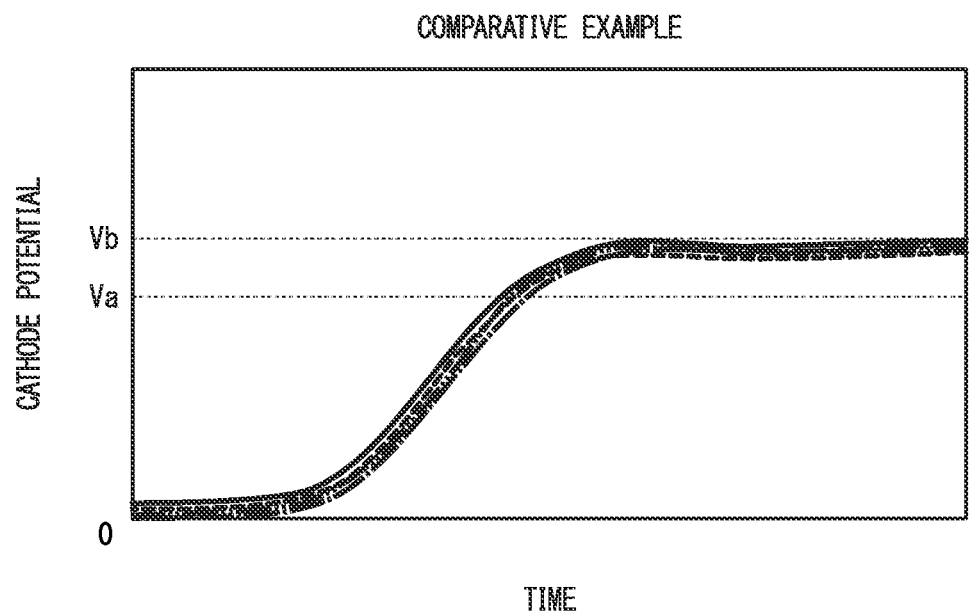
FIG. 5B is a graph showing an example of changes in the electrical potential of the cathode of a comparative example at the time of activating the fuel cell system.

In contrast, in the case where the fuel cell system 10 is activated without executing power generation of the fuel cell stack 11 (that is, discharge to the electrical load), as with a comparative example shown in FIG. 5B for example, the electrical potential of the cathode 11B of the plurality of fuel cells of the fuel cell stack 11 increases approximately to an electrical potential Vb, which is higher than a predetermined electrical potential Va, and the cathode catalyst may become deteriorated in some cases.

As described above, according to the fuel cell system 10 and the activation method for the fuel cell system 10 of the present embodiment, air is supplied to the cathode 11B via the cathode gas flow path 41 if hydrogen is determined as being present on the anode gas flow path 44, and it is therefore possible, in the state where hydrogen is not present at the anode 11A, to prevent air from being wastefully supplied to the cathode 11B via the cathode flow path 41.

Furthermore, it is possible, in the state where hydrogen is not present at the anode 11A, to prevent the fuel cell stack 11 from being connected to an electrical load, and it is also possible to prevent deterioration in the fuel cell stack 11 caused by insufficient anode gas at the time of power generation of the fuel cell stack 11.

Moreover, by performing power generation of the fuel cell stack 11 (that is, discharge to an electrical load) while maintaining the voltage VFC at or below the predetermined voltage, it is possible to prevent an excessive increase in electrical potential where no load is applied (for example, an increase in the electrical potential of the cathode 11B), and prevent deterioration in the fuel cell stack 11 caused by excessive increase in electrical potential.

Furthermore, when the sealing inlet valve 15 and the sealing outlet valve 16 in the shutoff state is switched to the open state and air supply to the cathode 11B via the cathode gas flow path 41 is started, by opening the bypass valve 18, it is possible, with the air that has flowed through the bypass flow path 43, to dilute the hydrogen in the cathode gas discharge flow path 42 that has been pushed out from the cathode 11B by the air.

Furthermore, since the air supplied to the cathode gas flow path 41 branches and flows to the cathode 11B and to the bypass flow path 43, it is possible to reduce the air to be introduced to the cathode 11B, and prevent the concentration of hydrogen to be discharged from the cathode 11B from becoming excessive.

Moreover, when performing power generation of the fuel cell stack 11 (that is, discharge to an electrical load), by closing the bypass valve 18 after opening the bypass valve, and opening the sealing inlet valve 15 and the sealing outlet valve 16, it is possible to have the cathode gas concentration of the cathode 11B precisely at a desired concentration.

Furthermore, when performing power generation of the fuel cell stack 11 (that is, discharge to an electrical load), by having the voltage VFC of the fuel cell stack 11 within a predetermined range with a constant voltage control for example, it is possible to easily prevent an excessive increase in the electrical potential without the need of complicated control.

Moreover, by executing the normal power generation mode including the idle operation state after completing the activation of the fuel cell system 10, it is possible to reduce the gas supply amount to the cathode 11B and the electric current to be generated, and improve the operation efficiency of the fuel cell system 10.

Furthermore, by executing the anode replacement, it is possible to have the hydrogen concentration of the anode 11A precisely at a desired concentration.

Moreover, by maintaining the sealing state of the cathode 11B with the sealing inlet valve 15 and the sealing outlet valve 16 when executing the anode replacement, it is possible to maintain the state of the oxygen concentration in the air within the cathode 11B system being lower than that of the atmosphere, and suppress the occurrence of in-plane current (that is to say, it is possible to suppress inter-electrode movement of hydrogen ions).

In the embodiment described above, for example, the contactor 30 and the circulation pump 22 may be omitted.

Moreover, in the case where the concentration of the hydrogen present at the anode 11A is preliminarily higher than or equal to a predetermined concentration, the anode replacement, that is, hydrogen supply to the anode 11A and opening of the purge valve 23 during a predetermined period, may be omitted.

In the embodiment described above, as shown in FIG. 4 for example, power generation of the fuel cell stack 11 is started after air has been supplied to the cathode 11B and then the voltage VFC of the fuel cell stack 11 has reached the predetermined power generation allowable voltage V1. However, it is not limited to this, and for example, power generation of the fuel cell stack 11 may start simultaneously as air supply to the cathode 11B starts.

Even in this case, since hydrogen is preliminarily determined as being present at the anode 11A, it is possible to prevent a shortage of anode stoichiometry (that is, the ratio of the supply amount with respect to the theoretical anode gas consumption amount required to output generated electric current at a desired level), and prevent deterioration in the fuel cell stack 11.

In the embodiment described above, with the sealing inlet valve 15 and the sealing outlet valve 16 being provided and the cathode 11B being brought to the sealed state, it is possible to excellently prevent the gaseous environment within the fuel cell stack 11 from being changed by an external environment.

In the embodiment described above, the sealing inlet valve 15 and the sealing outlet valve 16 may be omitted.

The present embodiment described above illustrates an example for carrying out the invention, and the invention should not be considered as being limited to the embodiment above.

What is claimed is:

1. A method for activating a fuel cell system comprising:
   a fuel cell that generates electric power with an anode gas supplied to an anode and a cathode gas supplied to a cathode;
   an anode gas flow path connected to the anode;
   an anode gas supplying device that supplies the anode gas to the anode gas flow path;
   a cathode gas flow path connected to the cathode;
   a cathode gas supplying device that supplies the cathode gas to the cathode gas flow path;
   a voltage detection device that detects a voltage of the fuel cell;
   an electrical load configured to connect to the fuel cell;
   a control device that controls the anode gas supplying device and the cathode gas supplying device;
   a bypass valve that is disposed on a bypass flow path through which the cathode gas can bypass the cathode of the fuel cell and be supplied to a cathode gas discharge flow path;
   a sealing inlet valve disposed on the cathode gas flow path; and
   a sealing outlet valve disposed on the cathode gas discharge flow path,
   wherein the fuel cell system comprises a determination device that determines whether or not the anode gas is present in the anode gas flow path, and
   wherein as an activation time power generation mode of the fuel cell, there are included:
   a first step of determining whether or not the anode gas is present in the anode gas flow path; and
   a second step of driving the cathode gas supplying device and supplying the cathode gas to the cathode through the cathode gas flow path,
   wherein when the anode gas is detected in the first step as being present in the anode gas flow path, executing a third step of determining whether or not a voltage of the fuel cell detected by the voltage detection device reaches a predetermined voltage, and when the voltage of the fuel cell reaches the predetermined voltage, executing a fourth step of connecting the electrical load to the fuel cell and performing electric power generation of the fuel cell while maintaining the voltage at or below the predetermined voltage,
   when the anode gas is detected in the first step as not being present in the anode gas flow path, skipping the third and fourth steps,
   wherein the method further comprises:
   opening the bypass valve after the first step;
   opening the sealing inlet valve and the sealing outlet valve in the second step; and
   closing the bypass valve at a time where a predetermined time has lapsed since the sealing inlet valve and the sealing outlet valve have been opened.

2. The method for activating a fuel cell system according to claim 1, wherein:
   the fuel cell system further comprises:
   a circulator disposed an anode gas circulation flow path configured to circulate the anode gas and circulate at least a part of the anode gas, which has been discharged passing through the anode and has not undergone a reaction, to the anode;
   a contactor configured to switch between a connected state and a cutoff state of the fuel cell and the electrical load; and
   a regulator that is disposed between the fuel cell and the electrical load and regulates a voltage and a current output from the fuel cell,
   wherein the electrical load includes the circulator,
   the circulator is configured to be driven by switching the contactor from the cutoff state to the connected state and regulating the voltage and the current output from the fuel cell with the regulator, and
   the method further comprising a step of circulating the anode gas to the anode by the circulator.

3. The method for activating a fuel cell system according to claim 1, wherein:
   the determination device executes:
   a first determination which determines whether or not a left-stopped time of the fuel cell system is within a predetermined time;

a second determination which determines whether or not a voltage of the fuel cell is equal to or less than a predetermined voltage; and a third determination which determines whether or not a pressure of the anode is equal to or more than a predetermined pressure, or whether or not a fluctuating range of the pressure of the anode within the left-stopped time of the fuel cell system is in a reduction tendency, wherein if at least one of results of the first determination, the second determination, and the third determination is positive, the determination device determines that the anode gas is present in the anode gas flow path.

4. A fuel cell system comprising:

a fuel cell that generates electric power with an anode gas supplied to an anode and a cathode gas supplied to a cathode;

an anode gas flow path connected to the anode;

an anode gas supplying device that supplies the anode gas to the anode gas flow path;

a cathode gas flow path connected to the cathode;

a cathode gas supplying device that supplies the cathode gas to the cathode gas flow path;

a voltage detection device that detects a voltage of the fuel cell;

an electrical load configured to connect to the fuel cell;

a control device that controls the anode gas supplying device and the cathode gas supplying device;

a bypass valve that is disposed on a bypass flow path through which the cathode gas can bypass the cathode of the fuel cell and be supplied to a cathode gas discharge flow path;

a sealing inlet valve disposed on the cathode gas flow path; and a sealing outlet valve disposed on the cathode gas discharge flow path, wherein the fuel cell system comprises a determination device that determines whether or not the anode gas is present in the anode gas flow path, and wherein as an activation time power generation mode of the fuel cell, the control device executes:

a first step of determining whether or not the anode gas is present in the anode gas flow path; and a second step of driving the cathode gas supplying device and supplying the cathode gas to the cathode through the cathode gas flow path, and wherein when the anode gas is detected in the first step as being present in the anode gas flow path, executing a third step of determining whether or not a voltage of the fuel cell detected by the voltage detection device reaches a predetermined voltage, and when the voltage of the fuel cell reaches the predetermined voltage, executing a fourth step of connecting the electrical load to the fuel cell and performing electric power generation of the fuel cell while maintaining the voltage at or below the predetermined voltage, when the anode gas is detected in the first step as not being present in the anode gas flow path, skipping the third and fourth steps, wherein the bypass valve is opened after the first step, wherein the sealing inlet valve and the sealing outlet valve are opened in the second step, and wherein the bypass valve is closed at a time where a predetermined time has lapsed since the sealing inlet valve and the sealing outlet valve have been opened.

5. The fuel cell system according to claim 4, wherein:
the fuel cell system further comprises:

a circulator disposed on an anode gas circulation flow path configured to circulate the anode gas and circulate at least a part of the anode gas, which has been discharged passing through the anode and has not undergone a reaction, to the anode;

a contactor configured to switch between a connected state and a cutoff state of the fuel cell and the electrical load; and a regulator that is disposed between the fuel cell and the electrical load and regulates a voltage and a current output from the fuel cell, wherein the electrical load includes the circulator, the circulator is configured to be driven by switching the contactor from the cutoff state to the connected state and regulating the voltage and the current output from the fuel cell with the regulator, and the control device executes a step of circulating the anode gas to the anode by the circulator.

6. The fuel cell system according to claim 4, wherein:
the determination device executes:

a first determination which determines whether or not a left-stopped time of the fuel cell system is within a predetermined time;

a second determination which determines whether or not a voltage of the fuel cell is equal to or less than a predetermined voltage; and a third determination which determines whether or not a pressure of the anode is equal to or more than a predetermined pressure or whether or not a fluctuating range of the pressure of the anode within the left-stopped time of the fuel cell system is in a reduction tendency, wherein if at least one of results of the first determination, the second determination, and the third determination is positive, the determination device determines that the anode gas is present in the anode gas flow path.

7. The method for activating a fuel cell system according to claim 1, wherein:
the fuel cell system further comprises:

an anode gas discharge flow path that is connected to a discharge side of the anode; and a purge valve that is configured to switch between an open state and a shutoff state of the anode gas discharge flow path with respect to the outside, the method further comprising:

a step of starting supplying of the anode gas to the anode gas flow path and opening the purge valve, before execution of the power generation determination step; and a step of closing the purge valve if a discharge amount of the anode is more than a predetermined amount after opening the purge valve.

8. The fuel cell system according to claim 4, wherein:
the fuel cell system further comprises:

an anode gas discharge flow path that is connected to a discharge side of the anode; and a purge valve that is configured to switch between an open state and a shutoff state of the anode gas discharge flow path with respect to the outside, and the control device further executes:

a step of starting supplying of the anode gas to the anode gas flow path and opening the purge valve, before execution of the power generation determination step; and a step of closing the purge valve if a discharge amount of the anode is more than a predetermined amount after opening the purge valve.

9. The method for activating a fuel cell system according to claim 7, wherein:
the fuel cell system further comprises:
a diluter that dilutes a concentration of the anode gas supplied from the purge valve; and
the method further comprising a step of opening the bypass valve before the step of opening the purge valve.

10. The fuel cell system according to claim 8, wherein:
the fuel cell system further comprises:
a diluter that dilutes a concentration of the anode gas supplied from the purge valve; and
the control device executes a step of opening the bypass valve before the step of opening the purge valve.

* * * * *